INVENTORS.
RICHARD B. LAWRANCE
RALPH R. FUNK
BERNARD S. ANGLISS
BY Henry L. Hanson
ATTORNEY Jan. 13, 1970 R. B. LAWRANCE ET AL 3,490,013
APPARATUS FOR DETECTING AND ELIMINATING NOISE RECORDS
DURING A DATA TRANSFER OPERATION
Filed May 24, 1967 3 Sheets-Sheet 2

Jan. 13, 1970 R. B. LAWRANCE ET AL 3,490,013

APPARATUS FOR DETECTING AND ELIMINATING NOISE RECORDS DURING A DATA TRANSFER OPERATION

Filed May 24, 1967 3 Sheets-Sheet 3

United States Patent Office 3,490,013

Patented Jan. 13, 1970

3,490,013

APPARATUS FOR DETECTING AND ELIMINATING NOISE RECORDS DURING A DATA TRANSFER OPERATION

Richard B. Lawrance, Winchester, Ralph R. Funk, Saxonville, and Bernard S. Angliss, Holliston, Mass., assignors to Honeywell Inc., Minneapolis, Minn., a corporation of Delaware

Filed May 24, 1967, Ser. No. 640,883

Int. Cl. G11b *5/00, 13/00;* G06f *11/00*

U.S. Cl. 340—174.1 19 Claims

ABSTRACT OF THE DISCLOSURE

Noise signal detection apparatus arranged to automatically identify and eliminate the effects of noise signals which may be transferred as one or more units of information by a control transfer circuit to a memory. Associated with the memory is control apparatus which is adapted to select an address for a starting storage location and successive storage locations within the memory. The noise detection apparatus includes logic for establishing a count in accordance with the number of units transferred to the memory and also includes logic for detecting whether the count is advanced to a predetermined minimum count when there has been a discontinuance of signals read from the tape for a predetermined period of time which is normally interpreted as the end of a data record. If the minimum predetermined count has not been established at this time, logic means are operative to inhibit the normal termination of the reading operation. Means associated with the transfer circuit is responsive at this time to generate a control signal to the control apparatus to automatically restore the next memory address to the starting address. In cases where the minimum count has been established, the noise detection apparatus is operative to permit the termination of the reading operation in a normal manner.

BACKGROUND OF THE INVENTION

The invention relates to apparatus for detecting and eliminating the effect of noise signals encountered within the inter-record gap between normal data records received from an input source which may be, for example, magnetic tape.

It has been found that during the reading of digital data from a magnetic tape by a tape read head, unwanted, non-data signals may be picked up by the associated read circuitry and transferred as one or more units of information to an associated memory as a normal data record. One or more of such groups of these "noise" signals have been defined as a "noise record." These signals may be generated by foreign particles or improper coating on the magnetic tape, by creases, scratches or tears in the tape, improper erasure of the tape, as well as line noises from the tape read circuitry. When a "noise record" is read and transferred as a normal data record, upon the identification of such information as being a "noise record," it has been the practice to use an associated programmed data processor to effect the retrieval of the desired tape record by the issuance of further instructions to the tape control device. It has been found that the number of control instructions required to effect successful retrieval of a record is largely dependent upon the size of the "noise record" and the relative positioning of the "noise record" with respect to the beginning of a normal data record. For example, where the tape read head, after the reading of the "noise record," is positioned between the "noise record" and the normal record to be read, retrieval of the normal record may be effected by the issuance of an additional read instruction. However, when the "noise record" occurs reasonably close to the beginning of the normal record to be read, it has been found that the tape read head may, after the reading of the "noise record," be positioned within the normal record itself. Thus, to retrieve such a normal record it is necessary that the central processor associated therewith issue additional instructions, such as read, backspace, etc., to the tape control device in order to ascertain the positioning of the "noise record" with respect to the beginning of the normal data record. Further, it has been additionally found that the retrieval of a data record may be essentially impossible in some cases in that a subsequent instruction, for example, a backspace instruction, may not be effective to position the tape read head between the "noise record" and the beginning of the data record to be transferred.

Some types of apparatus have proceeded to detect noise or "noise records" by using known error checking techniques. For example, one type of prior art system used for the detection of inter-record noise is predicated on the premise that any tape generated noise will appear as invalid units of information or frames when such units of information are subjected to a parity check which, in terms of a frame of information spanning several channels may be referred to as a vertical check. Such arrangements may include apparatus for directly suppressing the transfers of such invalid information during the transfer operation. One problem with respect to the above arrangement is that it has been found that generally, a tape defect may spread and include two adjacent tape tracks which is effective to cause a double error condition. Thus, under these conditions the noise may go undetected since it may be indistinguishable from valid information in a subsequent parity check. It has also been found that some tape defects, such as a hole in the oxide coating of the tape, may be picked up by the tape read head as two transitions thereby causing a double error in the longitudinal direction and this may go undetected when such units of information are subjected to a subsequent longitudinal parity check. Thus, both a vertical and longitudinal parity check have in many instances proved ineffective in detecting noise. A further disadvantage of the above-mentioned system arises from the fact that, since the noise detection process is performed on a frame basis, it relies on being able to recognize the beginning of a data record by noting the first valid data frame and upon the occurrence thereof, discontinues the noise check. Thus, under the circumstances where noise has been recognized as being a valid frame, it is possible that the remaining invalid units of information of a "noise record" may be subsequently transferred as valid information to a memory without detection. A further example of the case where the latter may occur, in addition to the above-mentioned double error condition, is where there has been an improper erasure of the data record prior to re-recording thereby causing apparently valid information to occur within the inter-record gap.

A second approach taken by some in solving the problem of detecting and eliminating inter-record noise, and more particularly "noise records," has been directed to the providing of special programming checks using a programmed central processor. In such systems, a program associated with the information transfer maintains a count of the number of units of information or frames transferred to the memory of the central processor and at the termination of the transfer operation, thus count is compared with a stored count. If this count is found to be less than the stored count, the program interrupts the record processing operation, initiates action both to eliminate the "noise record" from memory and to effect the retrieval of the normal data record. In addition to the requirement of having to allocate a portion of core memory to the storage of a checking program, this type of procedure has been found to consume a large amount of valuable central processing time in effecting both the detection and elimination of "noise records," in addition to the time required to retrieve the desired normal records in such cases. Further, it has been found that such checking programs may not be able to efficiently and effectively provide for all situations in which a "noise record" occurs within the inter-record gap. More importantly, the subject program check is unable to avoid the incorrect positioning of the tape read head within the inter-record gap after having detected the transfer of a "noise record," since the transfer operation must be terminated before the subject check can be performed by the program. Thus, after having read and transferred a "noise record" to memory, the tape read head may be positioned anywhere within the inter-record gap and even within the normal record to be read as mentioned previously. Further, since it is required that data be transferred to the memory of a central processor during the performance of the check, the program is unable to be utilized in determining the positioning of the tape read head relative to the record to read, in the case of a non-data transfer operation, as for example a backspacing operation.

SUMMARY OF THE INVENTION

By way of summary it is an object of the invention to provide novel apparatus for automatically checking for noise signals and more particularly "noise records" on a record basis whereby retrieval of the desired data record to be transferred, is effected without requiring additional processing time.

A further object of the invention is to provide apparatus which eliminates those "noise records" transferred as normal data records to a memory, without having to interrupt the transfer operation.

These objects are achieved in one embodiment of the invention by noise detection logic which includes means for establishing a count of the units of information received from the data tape source and transferred to a starting storage location and successive storage locations within a memory under the direction of control apparatus associated with the memory. When there has been a discontinuance of signals from the data tape source for a predetermined period of time, normally indicative of the end of a data record, the established count is checked and if it has advanced to a count less than a predetermined count, action is taken to inhibit the normal termination of the transfer operation. The one or more groups of noise signals defined as a "noise record" which are stored as a data record in the memory are automatically eliminated by a control signal produced by the noise detection logic which is operative to restore the control apparatus to select the address representing the starting storage location. Thus, subsequently transferred units of the desired or normal data record are stored in those storage locations which had previously stored the units of information identified by the subject detection logic as constituting a "noise record." The subject arrangement, by being operative to detect and eliminate "noise records" before the termination of the transfer operation, is able to effect the transfer of the normal data record called for during the same transfer operation. Further, the subject arrangement avoids the mispositioning of the tape read head of the tape device during the reading of data records by effecting the identification of a "noise record" prior to the termination of the reading operation. Additionally, the noise detection logic is adapted to perform the subject check during both a data and non-data transfer operation and irrespective of the direction of tape motion thereby avoiding the mispositioning of the tape read head within the inter-record gap in all situations.

The foregoing objects and features of novelty which characterize the invention, as well as other objects of the invention are pointed out with particularity in the claims annexed to and forming part of the subject specification. For a better understanding of the invention, its advantages and specific objects obtained with its use, reference should be had to the accompanying drawings and descriptive matter in which there is illustrated and described a preferred embodiment of the invention.

DESCRIPTION OF THE PREFERRED EMBODIMENT

Figure 1:
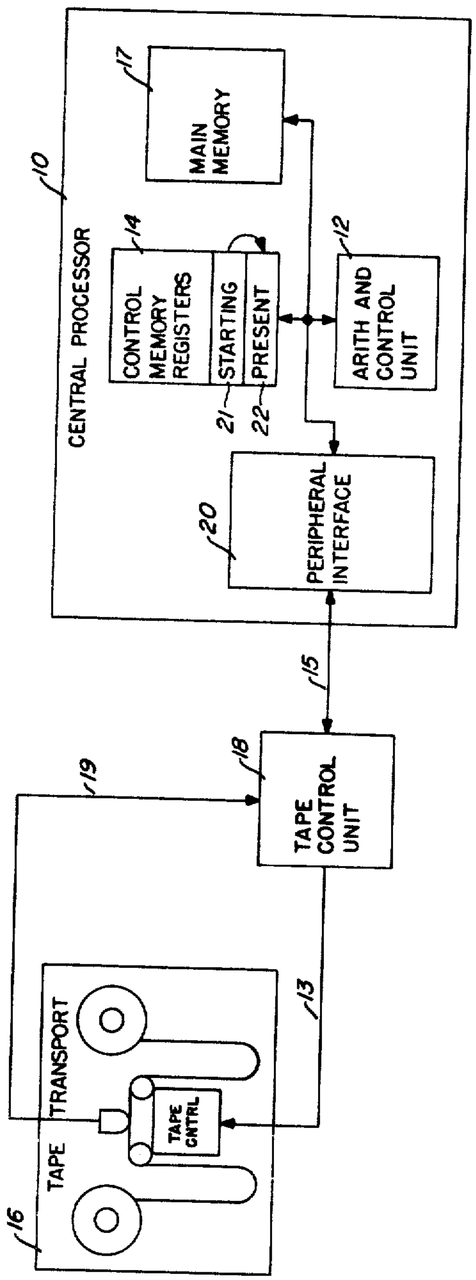
FIGURE 1 represents a form of data processing system into which the subject invention may be incorporated.

Referring now to FIGURE 1, there is illustrated a representative diagram of a data processing system in which the invention may be employed. The data processing system illustrated is one which contains a central processor 10, a tape control unit 18, and a tape transport 16. The central processor includes a main memory 17, a control memory 14, and a suitable arithmetic and control unit 12. Control memory 14 comprises a plurality of memory location registers of which only a "starting" location register 21 and a "present" location register 22 are shown. Both the memories 14 and 17 may take the form of addressable memories of the coincident current type, well known in the art. Central processor 10 also includes a suitable program control means designated as a peripheral interface 20 which is provided to operatively connect both main memory 17 and control memory 14 by way of a data and control bus 15 to tape control unit 18. The unit 18 is adapted to control the activity of the tape transport 16. Tape transport 16 may take the form of any known type of magnetic tape reading-recording apparatus adapted to convert a pattern of recorded flux variations on the associated tape into electrical signals. The signals read from tape by way of a tape read head are transferred from the read transfer circuitry of the tape transport 16 to the tape control unit 18 by way of a buss 19. Transport 16 further includes control apparatus responsive to command signals appearing on bus 13 from tape control unit 18 to drive the tape in a forward or reverse direction past a tape read head and to stop the tape. An example of one way in which the tape transport 16 may be implemented may be found in Patent 3,047,868 which is assigned to the assignee of the subject invention.

The data processing system contemplated is one wherein a number of transfer or read-write channels are provided for inter-connecting an associated data processor, on a time sharing basis, with any one of a number of peripheral devices, such as the tape transport 16. Associated with each read-write input from each transport is a starting location register 21 in the control memory 14 which stores an address to define the starting location in the main memory 17 at which the first input data associated with a particular data transfer is to be placed. A present location register 22 is adapted to store an address to identify the area of main memory 17 currently being addressed. The manner in which a programmer may initiate a data transfer operation between the memory and a peripheral device, by a particular one of the plurality of read-write circuits, may be as set forth in the copending application of Walter R. Lethin and Louis Oliari entitled, "Information Handling Apparatus," Ser. No.

364,686, filed May 4, 1964, which issued as Patent 3,369,221, is herewith incorporated by reference.

In order to provide for a more complete understanding of the subject invention, a brief description of the above-mentioned data transfer operation as is pertinent to FIGURE 1 will be presented. A transfer of information between main memory 17 and tape transport 16 is initiated by the programmer designating one of the read-write circuits to be associated with the particular transfer operation. This, plus additional information pertinent to the processing of the data transfer instruction, is extracted from a programmer supplied program instruction. The additional information includes the identity of the device involved, e.g. tape control address as well as tape transport address, the operation to be performed, e.g. read or write, as well as control information relative to the operation to be performed, e.g. tape motion forward or reverse. The digital representation identifying the address or location in main memory 17 at which the transfer is to begin is entered into both the present and starting location registers 22 and 21, respectively. A memory cycle distributor associated with the peripheral interface 20 permits the tape control unit 18 access to the memory and control logic of the central processor 10 during successive memory sub-intervals associated with the selected read-write circuits in accordance with coded demand response signals from tape control unit 18 which are returned by way of bus 19 htrough peripheral interface 20. These coded demand response signals may take the form of a frame-output or a frame-input demand, which initiates the reading or writing with respect to the tape control unit 18 or the central processor main memory 17 respectively, of a new unit of information whereby the contents of either register 21 or register 22 are modified in accordance with the type of operation being performed.

Moer specifically, during the execution of a read instruction wherein tape transport 16 is caused to read a record from tape into main memory, tape control unit 18 during the transfer operation is operative to generate frame-output demands during allocated memory cycles, each demand indicating a desire to effect the transfer of the unit of information receive by way of bus 19 from tape transport 16. In response to each demand, a unit of information from the tape transport is transferred and stored in the location of main memory 17 as identified by the present location register 22. Somewhat simultaneous with this information transfer, the contents of the present location register 22 are incremented by one so as to register the succeeding location of main memory 17 to be referenced.

The demand response signal may also be in the form of a special demand transfer signal which resets the present location register 22 of the associated read-write circuit in the control memory 14 to the address stored in the starting location register 21 so as to initiate the rescanning or reuse of the area of memory associated with a particular transfer operation. Since this interchange of operation has nothing to do with the main memory 17, it is effected by means of an internal transfer within the control memory 14.

With respect to the above-mentioned data transfer operation, when the tape control unit 18 detects that no further units of information are to be transferred to main memory 17 by the tape transport 16, an end of order signal is generated within the tape control unit 18 which is detected by a response decoder included within the peripheral interface 20 indicating that the particular data transfer instruction has been completed. The particular read-write circuit associated with the transfer is then reset and made available to other such devices, not shown in FIGURE 1.

Figure 2:
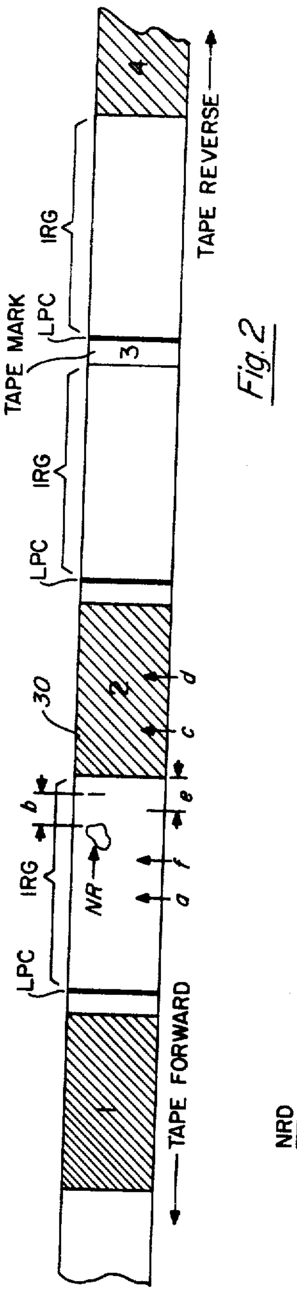
FIGURE 2 represents the manner in which data records may be stored on a section of magnetic tape.

Referring next to FIGURE 2, there is illustrated a section of magnetic tape 30 on which there are recorded four data records, 1, 2, 3 and 4, each single record being defined or separated by an inter-record gap, before and after the record. Each of the records may contain a variable number of units of information or frames uniformly spaced from one another along the tape 30. Each unit of information or frame consists of one or more signals recorded in a line transverse of the tape in the plurality of separate channels that run parallel to the length of the tape. It is assumed that the tape 30 contains 7 such channels, 6 carrying information and the 7th carrying a parity bit. Additionally, each record is also shown as containing an error-checking frame called a longitudinal parity check frame, LPC, which is written after the last frame of the record and is separated by a gap distance which is usually equivalent to four frame spaces. The comparatively short record 3 on tape 30 represents a tape mark which is conventionally employed at the end of a file of records and is sometime referred to as an end-of-file tape mark. Such a tape mark may contain one or more data frames and includes a first frame which is a specially coded bit configuration. The record 3 also has associated therewith an LPC frame. For purposes of illustration, it is assumed that the record 3 is a two frame record, which has a specially coded first frame and an LPC frame.

The problem of "noise records" may be better understood by a consideration of FIGURE 2 particularly in the situation where a "noise record" occurs within the inter-record gap, IRG. While the length of the inter-record gap may vary in accordance with the design of tape recording equipment employed for creating the stored record, in conventional recording equipment, the inter-record gap usually approximates .75 inch. This distance corresponds to the amount of tape that is not usable for data storage since some distance is required in order to have tape motion decelerate from full speed to a stationary position and then accelerate from a stationary position to the full or normal speed.

Assuming that the reading of record 1 has just been completed by the tape device, the end of the record is detected by the absence of signals being picked up by the tape read head in any of the tape channels for a predetermined period of time; this absence of signals denotes the fact that the inter-record gap has been entered. At this time the reading operation is terminated and the tape transport is signaled to stop moving tape. The tape motion decelerates until the tape reaches a stationary position. Thus, the tape read head, after having read a record from tape, is positioned some perdetermined distance beyond the last frame read and this may, for example, correspond to the position "*a*" of FIGURE 2. When another read instruction is issued by the central processor requesting the reading of record 2, the tape transport is again signaled to start moving tape forward and the tape accelerates from a stationary position to its normal operating speed.

Assuming the device has attained the normal operating speed, the transfer of information picked up by the tape read head from the tape channels begins. However, means associated with the tape control unit normally inhibits the reading operation for a predetermined time period to insure that the transient signals associated with a tape start have subsided. As previously mentioned, ideally no information should be encountered within the inter-record gap; however in this instance the "noise record," NR, occurring therein causes one or more groups of signals to be picked up by the tape read head and transferred and stored as one or more units of information of a normal data record in an area of memory of the central processor. When the tape read head has passed the "noise record" there is again an absence of signals within the inter-record gap for a predetermined period of time which may correspond to the distance "*b*," indicating an end of the record. The reading operation is again terminated and a signal is forwarded to the tape transport to stop forward tape motion. Depending on the size of the "noise record," NR, and its position relative to the beginning of record 2, when the tape comes to a stationary position, the tape read head may be positioned within record 2 which may correspond to the point "c." The signals which constitute the "noise record," NR, at this time reside in those locations of memory which have been allocated to record 2. Assuming the central processing program has the capability of detecting the fact that a "noise record" has been transferred to memory, attempts at retrieval of record 2 will be then initiated by the program. For example, a new read instruction may be issued wherein the tape transport is again signaled to move the tape forward. Since the reading operation is inhibited for a predetermined amount of time, as mentioned previously, the transfer of signals picked up by the tape read head may again begin at the point "d" when the tape has advanced halfway through record 2. In this case, only a portion of record 2 is read into memory and a program may also erroneously detect this information as constituting a "noise record." It may then be necessary to issue a backspace instruction whereby the tape transport is signaled to start moving tape in the reverse direction. When the tape has moved to the beginning of record 2, there is an absence of signals for a predetermined period of time which may correspond to the distance "e," which again indicates that the inter-record gap has been entered whereupon the tape transport is then signaled to stop tape motion. Tape motion will decelerate until the tape reaches a stationary position and since the "noise record" is positioned reasonably close to the beginning of record 2, the "noise record" is again positioned between the tape read head and the beginning of record 2, corresponding to a point "f." Thus, even after the above procedure is repeated, retrieval of record 2 may still not be possible.

In order to avoid the above stated problem, noise detection logic circuitry is provided to automatically detect the presence of "noise records" occurring within the inter-record gap during the reading operation; this logic circuitry is operative to permit the termination of the reading operation only after the desired record requested has been transferred to the memory of the central processor. Thus, mispositioning of the tape read head within the inter-record gap is avoided. The noise detection logic circuitry which effects the above in combination with the logic circuitry of the tape control unit, is shown in block diagram form in FIGURE 3 and in greater detail in FIGURE 4.

Figure 3:
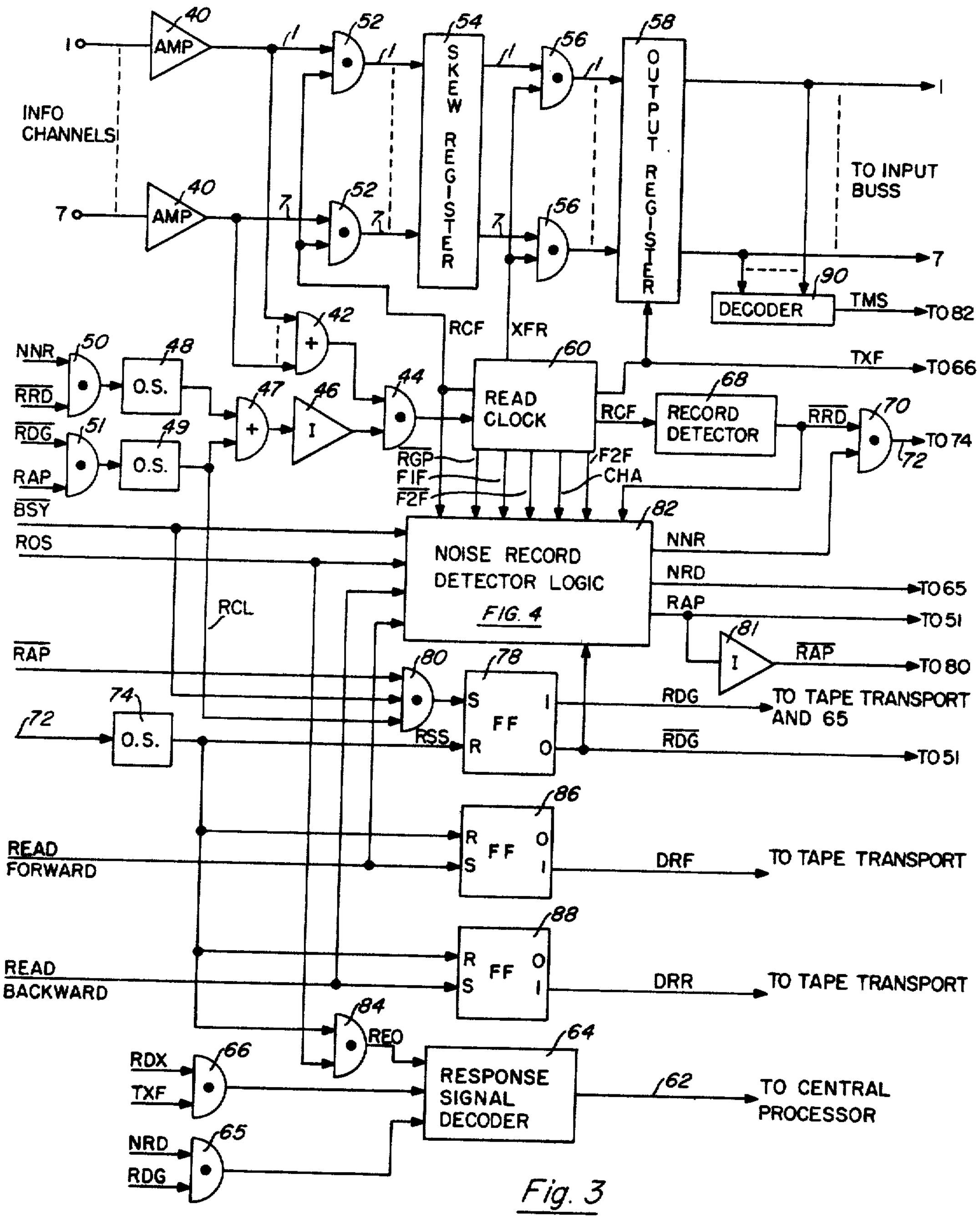
FIGURE 3, illustrates in greater detail the portion of the logic of the tape control unit of FIGURE 1.

With reference to FIGURE 3, there is illustrated a self clocking arrangement for effecting the processing of the units of information received from the tape read head of the tape transport. The arrangement is shown to include a plurality of amplifiers 40 each individually associated with one of seven information channels, each connected to one of seven reading heads (not shown) which comprise the read transfer circuitry. The outputs of each of the amplifiers 40 is connected to OR gate 42, the output of which is connected to an AND gate 44. The AND gate 44 has as a further input, the output of inverter 46 which is connected to a one-shot multivibrator 48 and a one-shot multivibrator 49 by way of an OR gate 47.

The multivibrator 48 is connected to receive as inputs by way of AND gate 50, a no-noise record signal, NNR, from noise detector logic 82 and a record detector reset signal $\overline{RRD}$ from a record detector 68. The multivibrator 49 is connected to receive as inputs, a head gate reset signal, $\overline{RDG}$, from a read gate flip-flop 78 and a read activate signal RAP from a "noise record" detector logic 82 by way of an AND gate 51. The outputs of the amplifiers 40 of each channel are also connected to gates 52, each of which are connected to receive as a further input, a timing signal RCF from read clock 60. The output of each of the gates 52 of each channel are connected to one of the seven bistable stages of skew register 54, the outputs of each of which are in turn connected to one of the seven gates 56. Each of the gates 56 are connected to receive as a further input, a timing signal XFR, from read clock 60. The outputs of each of the gates are connected to one of seven bistable stages which comprise output register 58, the latter is connected to receive as a further input, a timing signal TXF from read clock 60. Each of the output stages of register 58 are adapted to be connected to a central processor input buss (not shown) and to a decoder 90 which is connected to the noise record detector logic 82.

During a read operation, the first signal appearing in any one of the seven information channels on the tape will be amplified and converted to a desired signal level by amplifiers 40 for use in the logic circuits that follow. Any output signal produced by any one of the amplifiers 40 conditions the OR gate 42, to produce a further output at the gate 44 to trigger read clock 60 if there is an input signal present at the output of the inverter 46. Such is the condition approximately 2 milliseconds after the tape control unit has been activated by a "read" instruction. The latter is effected by the triggering of a one-shot multivibrator 49 which is operative to produce a 2 millisecond signal RCL. This signal is inverted by the inverter 46 and is operative to condition the AND gate 44 so as to inhibit the read clock 60 for the duration of the 2 millisecond signal after which the one-shot multivibrator 49 resets. This ensures that any switching transients occurring during a tape start transferred by the enabled read transfer circuitry of the tape transport do not inadvertently trigger the read clock 60.

A signal appearing at the output of AND gate 44 is effective to trigger the read clock 60 which goes through one complete cycle and generates the appropriate sequence of timing signals RCF, XFR, CHA, and TXF necessary to effect the processing of each group of signals appearing within each of the channels as inputs to amplifiers 40 within a specified time interval. This timing interval is denoted by the duration of the signal RCF produced by the read clock 60 upon the arrival of a first signal in one of the seven information channels whereby all information occurring within the specified time after the sensing of the first signal is assumed to belong to that particular group. Thus, the timing signal RCF, under an assumed worst condition of tape skew, is effective to gate the data signals from each of the channels appearing on the outputs of amplifiers 40 within the above-mentioned timing interval, into the skew register 54 as a data frame.

After a predetermined time period, the timing signal XFR is generated and effects the transfer of the contents of the skew register 54 to the output register 58. Subsequently the timing signal TXF is generated by read clock 60 which effects the transfer of the contents of the output register 58 onto the input bus of the central processor. Timing signal TXF is also connected as an input to an AND gate 66 which receives as a further input, a read data transfer signal, RDX, generated by the central processor at the beginning of the "read" instruction. The AND gate 66 is connected as an input to a response signal decoder 64 which, upon the activation of gate 66 is conditioned to generate, along with the above-mentioned data transfer, an appropriate coded response signal in the form of a frame-output on line 62 which leads to the central processor. The response decoder 64 may be implemented in any known manner so as to produce a group of coded signals and may for example take the form of the response decoder shown in the above-mentioned co-pending application of Lethin and Oliari. The timing signal CHA is connected as an input to the noise detector logic 82 and permits the sampling of the contents of register 58 for the presence of a special tape mark prior to the transfer of the contents of register 58 to the central processor. The significance of the special tape mark is explained below.

The above-mentioned timing signals required for the assembling and processing of each frame of information received from the information channels, may be generated by any suitable connection of logic circuitry well known in the art. For example, the read clock 60 may comprise a group of one-shot multivibrators connected in series with associated gating structure which may be adapted to effect the proper sequence of timing signals and requisite time durations of each timing signal. An example of such an arrangement which may be adapted to produce the above-mentioned sequence of timing signals, may be found in Patent 3,214,695 assigned to the assignee of the subject invention.

The timing signal RCF which controls the subsequent cycling of read clock 60 during the processing of each frame of information, is connected as an input to the record detector 68 which is in turn connected as an input to an AND gate 70. The gate 70 has as a further input, the signal NNR from the noise record detector logic 82. The read clock 60 is adapted to produce as a further output, by means not shown, a signal $\overline{RGP}$ as an input to the "noise record" detector logic 82. The record detector 68 may take the form of resettable delay circuits which may comprise monostable multivibrators, or other similar devices, which are adapted to be set by an input signal, in this case the signal RCF, to a first state and following a predetermined period of time, in the absence of further input signals, are automatically reset to a second state. One manner in which the record detector circuit 68 may be implemented is set forth, in detail, in Patent 3,146,430 assigned to the assignee of the subject invention. The same identical circuit may be used in the read clock for producing the signal $\overline{RGP}$ differing from record detector circuit 68 only with respect to the length of the delay of the circuit. The output of record detector 68 remains high when in a set condition, as long as timing signal RCF is generated at an interval of time which is less than the predetermined time period of the record detector. When there is an absence of signals appearing in any of the information channels for a predetermined period of time, equal to the period of delay of the detector 68, there will be a corresponding absence of the timing signal RCF for the same predetermined period of time which is effective to switch the record detector 68 to its reset state, thereby operative to produce as an output, the signal $\overline{RRD}$. The latter signal may be assumed to be of short duration so as to properly define the resetting of the record detector circuit. In order to accomplish the resetting, the record detector 68 may include a further one-shot multivibrator operative to produce the signal $\overline{RRD}$ upon the resetting of the associated resettable delay circuit. Since the delay time associated with the signal $\overline{RGP}$ is much shorter than that of the record detector 68, the signal $\overline{RGP}$ is produced prior to the signal $\overline{RRD}$. The read clock 60 is also adapted to produce the signals Found First Frame, F1F, $\overline{\text{Found Second Frame}}$, $\overline{F2F}$, and Found Second Frame, F2F, at the beginning of the reading operation, either when a first frame has been detected and a second frame has not been detected, or when both a first and second frame have been detected. The above signals may be produced in any desired manner well known in the art. For example, the read clock 60 may include bistable storage devices connected to form a counter for counting the first two frames read at the beginning of a reading operation in which case the counter is adapted to be reset at the beginning of a read operation and incremented by the timing signal XFR denoting the receipt of a frame of data.

The output 72 of AND gate 70 is connected to a one-shot multivibrator 74 which is operative when triggered to produce as an output a read stop signal, RSS, which effects both the termination of the read data transfer operation and tape motion. The signal RSS is applied as an input to the reset side of each of three separate flip-flops 78, 86 and 88, respectively. The set side of the read gate flip-flop 78 is connected to receive by way of an AND gate 80, a not busy signal $\overline{BSY}$, a signal $\overline{RAP}$ from the inverter 81 and the signal RCL from the multivibrator 49. When the read gate flip-flop 78 is switched to its reset state, it is operative to apply as an input, the signal $\overline{RDG}$, to the "noise record" detector logic 82 and to the gate 51. Upon being switched to its set or "1" state, the flip-flop 78 is operative to apply as input, a read gate signal RDG to the tape transport which effects the activation of the read transfer circuitry. The signal RDG is also connected as an input to an AND gate 65 which is connected to receive as a further input, a "noise record" detected signal, NRD, from the "noise record" detection logic 82. The AND gate 65, when activated, is operative to condition the response signal decoder 64 to produce a coded response signal in the form of a special demand transfer signal on the line 62, to the central processor.

The signals READ FORWARD and READ BACKWARD are applied to the set inputs of a flip-flop 86 and a flip-flop 88 respectively; each of which when switched to a set or "1" state is operative to produce either a drive forward signal DRF, or a drive reverse signal DRR respectively, which are forwarded as inputs to the tape transport. The read stop signal, RSS, and a read order stored signal, RDS, are applied as inputs to an AND gate 84 which when activated is adapted to produce a read end of order signal, REO, for conditioning the response signal decoder 64 to generate a coded response signal, also in the form of an "end of order" signal on the line 62 to the central processor, indicating the termination of the transfer operation and the completed execution of the "read" instruction by the tape control unit.

In addition to receiving as inputs the signals $\overline{BSY}$ and ROS, the "noise record" detector logic 82 has also applied as inputs, the signals RCF, $\overline{RPG}$, F1F, $\overline{F2F}$, F2F and CHA from the read clock 60. As mentioned previously, the "noise record" detector logic 82 is connected to receive as a further input, a tape mark sense signal, TMS from the decoder 90.

Figure 4:
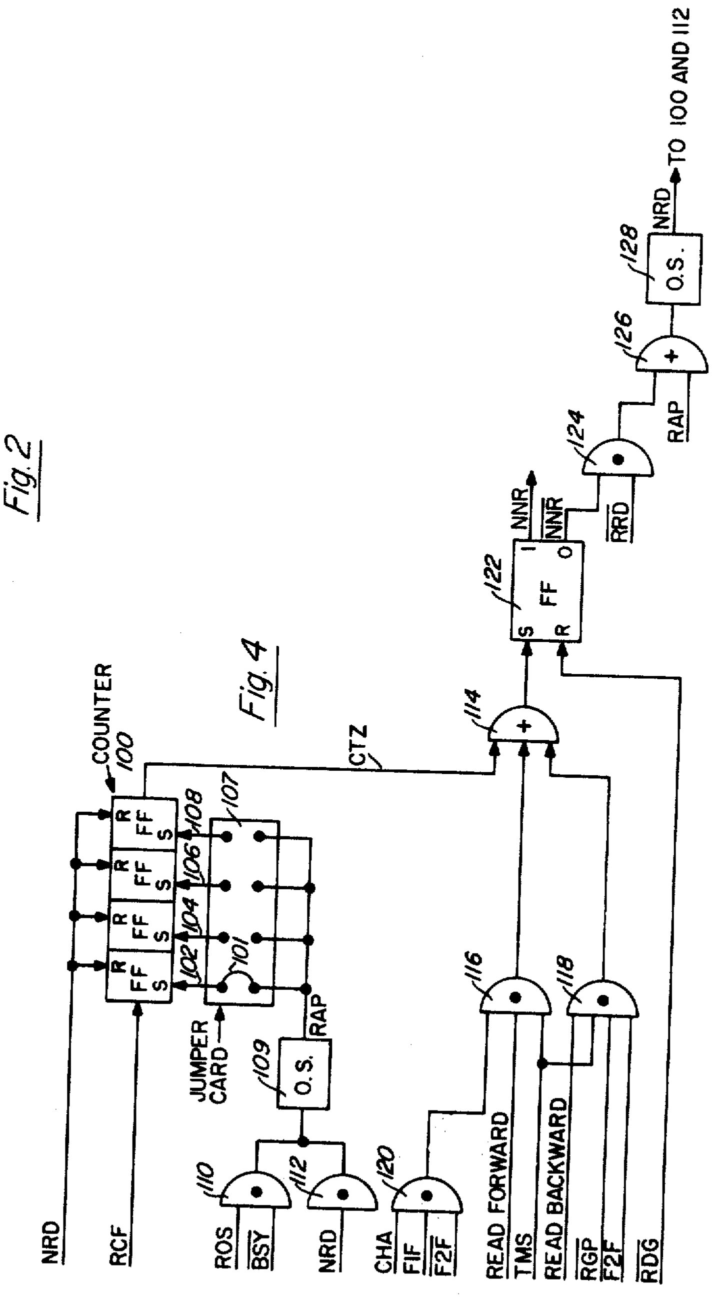
FIGURE 4 illustrates, in detail, the noise detection logic of FIGURE 3.

Referring now to FIGURE 4, the noise detector logic 82 of FIGURE 3 may be seen to comprise a four-stage digital counter 100 connected to receive as a reset input, the signal NRD and as a set input, the signal RAP. The counter 100 is connected to have its contents modified by the signal RCF from read clock 60. The signal RAP is connected to be applied to the set inputs of each of the four stages 102, 104, 106 and 108 respectively, of the counter 100, by way of jumpers 101 of a jumper card 107. In the subject arrangement, the counter 100 may be preset from a count of 1–16 by means of the jumpers 101 and is shown as having been wired to a count of 8. A one-shot multivibrator 109 is connected to generate as an output the signal RAP upon the activation of either of two input gates 110 or 112. The AND gate 110 is connected to receive as inputs, the signals ROS and $\overline{BSY}$ while the gate 112 is connected to receive as an input, the signal NRD.

The counter 100 also includes decoder means which are adapted to produce as an output, the signal CTZ when the contents of counter has been decremented to zero. The latter decoder means may take the form of decoder logic well known in the art and, for example, may comprise a single AND gate connected to receive as inputs, each of the set outputs of the four stages comprising the counter 100. The signal CTZ is applied as an input to an OR gate 114. Also connected to the OR gate 114 are the outputs from a further pair of AND gates 116 and 118. The OR gate 114 is further connected to the set side of a "noise record" flip-flop 122. The signals CHA, F1F, $\overline{F2F}$ are connected as inputs to an AND gate 120 which is connected to the AND gate 116 and which has as further inputs the signals, READ FORWARD, and TMS. The AND gate 118 is connected to receive as inputs, the signals TMS, READ BACKWARD, $\overline{RGP}$, and F2F. The signal $\overline{RDG}$ is connected as an input to the reset side of the "noise record" flip-flop 122 which when switched to its set state is operative to produce as an output, the signal NNR. When switched to its reset state, the flip-flop 122 is connected to produce as an output the signal $\overline{NNR}$ which is applied as an input to an AND gate 124 which also has as a further input, the signal $\overline{RRD}$. The AND gate 124 is connected to an OR gate 126 which is also connected to receive, as a further input, the signal RAP. The OR gate 126 is connected to a one-shot multivibrator 128 which is adapted when triggered to produce the signal NRD.

DESCRIPTION OF OPERATION

Figure 1A:
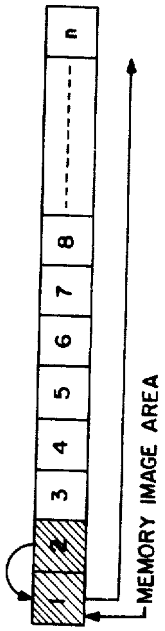
FIGURE 1A illustrates a section of the memory used in the system shown in FIGURE 1 which will be used in explaining the operation of the subject invention.

In order to understand the operation of the present invention it is first assumed that it is desired to transfer a record of information designated as record 2 of the tape 30, shown in FIGURE 2, into an assigned area of the main memory 17 of FIGURE 1 is diagrammatically illustrated in FIGURE 1A. The memory area of FIGURE 1A is shown to comprise sequential storage locations. It is further assumed that the programmer has assigned a read-write circuit to the tape control unit 18 of FIGURE 1 and has issued an appropriate data transfer instruction. At this time, both the starting location registers and the present location register 21 and 22 respectively, of control memory 14 are storing the digital representation identifying the location in the main memory 17 to which the data transfer is to begin, the location corresponding to the first storage location of the memory image area of FIGURE 1A. Additional information is extracted from the program instruction and transferred to the tape control unit 18 which is decoded by the unit and effects the generation of several control signals including the signal ROS which remains set until the "read" instruction is completed. Also generated is the signal RDX which indicates that the information received by the tape control unit 18 from transport 16 is to be transferred to the central processor memory 17 and the signal READ FORWARD which is operative to switch the flip-flop 86 from its normally reset state to its set state thereby generating the signal DRF. This signals the tape transport 16 to start moving the tape in a forward direction.

Since the tape control unit 18 is assumed to have not been processing a previous order, the signal $\overline{BSY}$ is present and the latter, along with the signal ROS, is operative to activate the AND gate 110 of FIGURE 4, so as to trigger the one-shot multivibrator 109 which is operative to produce as an output, the signal RAP. Both the read gate flip-flop 78 and the "noise record" flip-flop 122 are normally in reset state, the latter being previously switched by the signal $\overline{RDG}$ from the read gate flip-flop 78. Therefore, the signal $\overline{NNR}$ from "noise record" flip-flop 122 is effective to condition the OR gate 124 which is operative to activate gate 126 when the signal RAP is generated so as to trigger the one-shot multivibrator 128 which produces as an output the signal NRD. The signals NRD and RAP together switch the counter 100 to a count of 8. This switching is effected by arranging the signals NRD and RAP to be of different duration whereby there occurs first the resetting of the four-stage conuter 100 by the signal NRD and then the setting of the counter 100 to a predetermined count of 8 by the signal RAP.

The presence of the signals $\overline{RDG}$ and RAP activate the AND gate 51 which is operative to trigger the one-shot multivibrator 49 producing as an output for a period of two milliseconds, the signal RCL. Upon the resetting of the multivibrator 109, the AND gate 80 activated by the signals $\overline{RAP}$, RCL and $\overline{BSY}$ is operative to switch the read gate flip-flop 78 from its reset to its set state. The read gate signal RDG is forwarded to the tape transport and is operative to activate the associated read transfer circuitry at that time. The signal RCL applied to gate 44 by way of the OR gate 47 and the inverter 46 inhibits the read clock 60 for two milliseconds. Following the two millisecond interval, the read clock 60 is enabled and the first signal occurring within any of 7 information channels is effective to trigger the clock 60 which is operative to produce the timing signal RCF.

With reference to FIGURE 2 in the example under consideration, the first signals encountered within the tape 30 are not those of the desired record 2 but are those signals caused by the "noise record," NR, occurring within the inter-record gap IRG. It is assumed that the "noise record," NR endures for a period corresponding to two frame intervals. The signal RCF is effective to gate within one-half frame interval the signals appearing in the 7 channels into a skew register 54 and also trigger the record detector 68, which is initially in its reset state to its set state. The gates 56 are conditioned by the signal XFR to transfer the contents of the register 54, corresponding to the first group of signals which constitute a frame, to the output register 58. The timing signal TXF conditions the register 58 to transfer the frame onto the input bus. Simultaneously with this transfer, a signal is produced at the output of the AND gate 66 which is effective to condition the response signal decoder 64 to generate a coded response signal in the form of a frame-out demand on line 62 to the central processor 10. The central processor 10 at this time is responsive, through control memory 14 and peripheral interface 20, to transfer the frame of the "noise record," NR, appearing on the input bus into the first storage location (1) of the memory area of FIGURE 1A. Almost simultaneous with this information transfer, the contents of the present storage location register 22 are incremented by one and now indicate the next storage location of the memory area into which a unit of information is to be stored.

The signal RCF appearing as an input to the counter 100 conditions the counter so as to modify the contents thereof by one, so that the counter 100 now stores a digital count of 7. The first of the next group of signals of a second frame occurring within the information channels appearing at any one of the outputs of the amplifiers 40 is again effective to trigger the read clock 60 which is operative to produce the timing signal RCF. This signal conditions the gates 52 to transfer the second group of noise signals appearing as inputs within one-half frame interval into the register 54. Since the maximum time between frames is relatively short in comparison to the predetermined time period of the record detector 68, the detector 68 remains set and is adapted by the timing signal RCF to start its timing interval over again. This process will continue whereby the record detector 68 remains in the set state so long as information signals continue within the specified time interval established within the record detector circuit 68.

The second group of signals stored in the register 54 are again transferred to the output register 58 by the signal XFR and onto the input bus by the signal TXF which activates the AND gate 66 to again condition the response signal decoder 64 in a manner as to generate a frame-output demand signal. This demand signal applied by way of the peripheral interface 20, conditions the central processor 10 to transfer and store the second frame of the "noise record," NR appearing on the input bus in the storage location identified by present storage location which corresponds to the second location (2) of the memory image area of FIGURE 1A. The contents of the present storage location register 22 are again incremented by one. The signal RCF is also effective at this time to modify the contents of the counter 100 of FIGURE 4 by one whereby the counter 100 now contains a digital count of 6.

After the transfer of the second frame of the "noise record," there is an absence of signals occurring within the inter-record gap, IRG. As long as no signals appear on the outputs of the amplifiers 40, the read clock 60 is not triggered during this time period and accordingly, the signal RCF is not generated. Assuming that the absence of signals endures for a time period greater than the specified time period corresponding to the resetting of record detector 68, the record detector 68 resets and is operative at that time to produce as an output the signal $\overline{RRD}$ signaling the end of the record. Since contents of counter 100 has not been decremented to zero indicating that the number of frames of the record just processed is less than the specified minimum of 8, the signal CTZ is not present as an input to OR gate 114 and therefore the "noise record" flip-flop 122 is still reset. Normally, no signals are applied as inputs to gate 114 by way of either the gate 116 or the gate 118. The reason for the latter will be explained below. Thus, the gate 124 is made active by the presence of input signal $\overline{NNR}$ upon the resetting of the record detector 68 and is operative to condition the OR gate 126 to produce an output which triggers the one-shot multivibrator 128. The multivibrator 128 is operative to produce as an output, the signal NRD indicating the fact that a "noise record" has been detected by the noise detector logic 82. The signal NRD is operative to trigger the one-shot multivibrator 109 thereby producing as an output, the signal RAP. The signals RAP and NRD are effective, in the manner previously described, to again preset the counter 100 to a count of 8. Since the "noise record" detector logic 82 at this time is not operative to produce, as an output, the signal NNR, the AND gate 70 is not activated upon the resetting of the record detector 68 and the normal generation of the read stop signal RSS is inhibited. Thus, read gate flip-flop 78 remains in its set state and the end of order signal by response decoder 64 is not generated. The read clock 60 is not inhibited during this time period because of the absence of the signals NNR and $\overline{RDG}$ which is effective to inhibit the activation of the AND gates 50 and 51 respectively, thereby preventing the triggering of either of the one-shot multivibrators 48 or 49.

The presence of the signals NRD and RDG are operative at this time to activate the AND gate 65 which conditions the response signal decoder 64 to produce a special demand transfer signal on the line 62 which is forwarded to the central processor 10. The central processor 10 is responsive to the special demand transfer signal by way of the peripheral interface 20 and the control memory 14 to reset the present storage location register 22, of the associated read-write circuit in the control memory 14, to the representation stored in the starting storage location register 21. This action automatically eliminates the prior allocation of the first two memory storage locations (1) and (2) of FIGURE 1A to those frames which have been detected by the noise detection logic 82 as constituting a "noise record." The tape transport continues its forward tape motion since the flip-flop 86 is still in a set state due to the fact that the read stop signal, RSS, has not been generated. Thus, the reading operation continues as prior to the resetting of the record detector 68.

In the subject example, the next group of signals appearing at the outputs of the amplifiers 40 are those corresponding to the first frame of record 2, the actual or normal record which it is desired to read. The first group of signals is effective to trigger the read clock 60 which produces the signal RCF which is operative to again set the record detector 68 and decrement the counter 100 from a count of 8 to a count of 7. The signals appearing at the outputs of the amplifiers 40 during one-half frame interval are gated by the signal RCF into the register 54 and transferred by the signal XFR to the output register 58. The signal TXF effects the transfer of the frame contained in the output register 58 onto the input bus along with the generation of a frame output demand by the response signal decoder 64 on the line 62. The central processor 10 is responsive to store the first frame of the actual data record in the first storage location within the area of main memory of FIGURE 1A which up to now was storing the previously transferred noise frame and increment the contents of the present storage location register 22 by one. Thus, the data frame, of the desired record is permitted to be written over the detected noise frame.

The subsequent groups of signals corresponding to frames of the normal record 2 are received by the skew register 54 and transferred to the central processor 10 along with the frame output demand signal. Each of the frames are stored sequentially in the storage locations of the area of memory as designated by the contents of the present storage location register 22 which are incremented simultaneously with the transfer of each frame. Each frame received and transferred is as mentioned previously effective to trigger the read clock 60 which produces the signal RCF which decrements the counter 100. Thus the contents of the counter 100 are modified in accordance with the number of frames received from the read transfer circuitry of the tape transport 16 and transferred by the tape control unit 18 to the area of the main memory 17. When the eighth group of signals corresponding to the eighth frame of record 2 is received from the read transfer circuitry, the signal RCF is again generated which is effective at this time to decrement the counter 100 by one so as to have the counter 100 contain a count of zero. At this time, the output signal CTZ is produced by counter 100 which is effective to set the "noise record" flip-flop 122 to its one state, thereby producing the output signal NNR indicating that the number of frames of the record processed thus far corresponds to the specified minimum of 8. Thus the frames being transferred to the memory 17 of the central processor 10 constitute frames of a normal data record. In the absence of further signals appearing at the outputs of the amplifiers 40 for a predetermined time period exceeding the time period of the record detector 68, the detector is reset and this is operative to produce as an output, the signal $\overline{RRD}$ signaling the end of the record. Since the "noise record" flip-flop 122 is in its set state, the signal $\overline{RRD}$ is not effective to activate the AND gate 124 which thereby prevents the generation of the "noise record" detection signal NRD by the one-shot multivibrator 128. The presence of both $\overline{RRD}$ and NNR at the input of the AND gate 70 actuates the gate which is operative to produce an output on line 72 effective to trigger the one-shot multivibrator 74. The one-shot multivibrator 74 is operative at this time to produce as an output, the read stop signal RSS which effects the termination of the read data transfer operation by switching the read gate flip-flop 78 from its set to its reset state which produces as an output, the signal $\overline{RDG}$; this signal is effective to switch the "noise record" flip-flop 122 from its set state to its reset state. Since the record detector 68 has been previously reset, the resetting of the "noise record" flip-flop 122 does not activate the AND gate 124. The signal RSS is also effective to switch the flip-flop 86 from its set to reset state thereby producing as an output, the signal $\overline{DRF}$ which signals the tape transport 16 to stop forward tape motion. At this time and "end of order" signal is generated to the central processor 10 releasing the assigned read-write circuit on line 62 by the response signal decoder 64 which is conditioned by the application of the signals RSS and ROS as inputs to the AND gate 84. Thus, the "noise record" detector logic 82 is operative, upon the establishment of a count which corresponds to the predetermined count to permit the normal termination of the "read" instruction.

It should be appreciated that the records recorded on magnetic tape 30 of FIGURE 2 must consist of a minimum of 8 frames so as to not be identified by the "noise record" detector logic 82 of FIGURE 4 as a "noise record" and automatically eliminated from memory. There is one situation in which a normal record may contain only two frames and this corresponds to the record 3 of FIGURE 2 which is designated as a tape mark. In order to prevent this record from being eliminated by the "noise record" detector logic 82 as a "noise record," the logic 82 has been adapted to recognize the tape mark as a normal data record irrespective of the minimum frame requirement as established by the preset count of counter 100, whether the tape be moved in either a forward direction or reverse direction.

The manner in which this may be effected will now be described with reference to FIGURES 2, 3 and 4. Both the AND gates 120 and 116 of FIGURE 4 are activated when the presence of a tape mark is detected and when tape motion is in a forward direction while the AND gate 118 is activated when the presence of a tape mark is detected when tape motion is in a reverse direction. The outputs of the AND gates 116 and 118 appear as inputs to the OR gate 114. Thus, either of the gates 116 or 118 when activated is operative to switch the "noise record" flip-flop 122 from its reset state to its one state by way of OR gate 114 irrespective of the count having been established by the counter 100 at that time.

Assuming that a "read" instruction has been issued by the central processor in which case a read forward signal appears at the input of the AND gate 116, the tape 30 of FIGURE 2 advances until a first group of signals representative of the first frame of record 3 appears at the outputs of the amplifiers 40. The first of these signals is effective to trigger the read clock 60 thereby producing the signal RCF. The signal RCF conditions the gates 52 to transfer the group of signals occurring within one-half frame time interval into the skew register 54 and the group of signals, constituting the frame, are transferred to the memory 17 of the central processor 10 in the same manner as previously described. Since record 3 is a tape mark, the first frame contained within the output register 58 will be of special coded bit configuration which causes the decoder 90 to produce, as an output, a tape mark sense signal TMS which is applied as an input to the AND gate 116 of the noise detector logic 82 of FIGURE 4. Since this specially coded frame appears as the first frame within record 3, the signals CHA, F1F and $\overline{F2F}$ are generated by means included within read clock 60 and also appear as inputs to the AND gate 120. The gate 120 is activated at that time and is operative to activate the AND gate 116 which switches the normally reset flip-flop 122 to its set state thereby producing the signal NNR. This indicates that record 3 of FIGURE 2 has been identified by the noise detector logic 82 as a normal data record. Thus, when the record detector 68 output falls, upon the resetting thereof, being operative at that time to produce the signal $\overline{RRD}$ signaling the end of the record, the read operation due to the presence of signal NNR will be terminated by the tape control unit in a normal manner.

In the case where a read backward instruction is issued to the tape control unit 18 by the central processor 10, a read backward signal appears as an input to the AND gate 118. When normal operation has been established, the first frame received from magnetic tape 30 appearing at outputs of the amplifiers 40 is longitudinal parity check frame, LPC. This frame is followed by an absence of signals which is operative to effect the generation of the signal $\overline{RGP}$ by the read clock 60. The signal $\overline{RGP}$ properly defines gap distance occurring between the last frame of the record and the LPC frame. As mentioned previously, the signal $\overline{RGP}$ may be produced by means of a resettable delay circuit which is operative to be reset when there is the absence of frames for a period of two frame intervals, thereby producing as an output, the signal $\overline{RGP}$. The delay means is again set upon the reading of a subsequent frame of the record 3 which corresponds to the specially coded first frame upon the transfer of the second frame within record 3. The signal F2F is generated by previously mentioned means included within the read clock 60 along with the tape mark sensed signal TMS, produced by the decoder 90 of FIGURE 3 indicating that the frame received by the register 58 is of a specially coded configuration. Upon the absence of frames for two frame intervals, the signal $\overline{RGP}$ is again generated by the read clock 60. At this time the AND gate 118 is activated and is operative to activate the OR gate 114 which effects the switching of the "noise record" flip-flop 122 from its reset state to its set state, producing the signal NNR. Thus, when the record detector 68 is subsequently reset it is operative at that time to produce the signal $\overline{RRD}$. The presence of the signal NNR, permits the activation of the AND gate 70 upon the resetting of the record detector 68 which thereafter effects the normal termination of the read backward operation.

It should be appreciated that the noise detection logic 82 operates in the same manner when the instruction issued to the tape control unit 18 is one wherein no data is required to be transferred to memory 17 such as a backspace or forward spacing operation. In such cases, the read data transfer signal, RDX, is not present as an input to the AND gate 66 of FIGURE 3. Consequently no frame-output demand signals are produced by the response decoder 64 and thus no information is transferred to the memory 17 of the central processor 10. Thus, the "noise record" detector logic 82 is operative in all cases to inhibit the termination of the particular operation until it has been determined that a count corresponding to a predetermined count has been established thereby preventing the mispositioning of the tape read head within the inter-record gap.

In summary, there has been described an arrangement for detecting and eliminating the effect of "noise records" from a data source received and transferred to an area of main memory by a transfer circuit. The "noise record" or records are identified by the establishment of a count which is checked during the absence of signals for a predetermined period of time, indicative of the end of the data record, and if the established count exceeds a predetermined count, action is taken to automatically eliminate those signals already transferred to an area of memory. The elimination of those signals is effected by the generating of a transfer signal to effect the resetting of control apparatus adapted for selecting a starting address for a starting location and successive storage locations within an area of memory whereby this apparatus is reset to the above-mentioned starting address.

Although the invention has been described in terms of a magnetic tape device serving as a source of data and "noise records," it should be obvious that the teachings of the invention may be applicable to other types of data sources which may erroneously transfer noise signals such that they may be uniquely identified with respect to normal or desired data.

Having now described the invention, what is claimed as new and novel and which it is desired to secure by Letters Patent is:

1. Data processing apparatus for eliminating the effect of noise signals transferred as units of information from a data source comprising:

memory means having a plurality of addressable storage locations connected to receive signals from said data source by way of a transfer circuit and being adapted to store said transferred signals as units of information in selected memory storage locations;

first means coupled to said memory means and being adapted to select an address for a starting storage location and successive storage locations within said memory means for storing said units of information;

noise signal identification means connected to said transfer circuit and being adapted to produce a control signal indicative of an unwanted signal condition in signals being transferred to said memory means; and means responsive to said control signal and connected to said first means to select the address representing said starting storage location.

2. Data processing apparatus for eliminating the effect of noise signals transferred as units of information from a data source comprising:

memory means having a plurality of addressable storage locations connected to receive signals from said data source by way of a transfer circuit and being adapted to store transferred units of information in selected memory storage locations;

first means coupled to said memory means and being adapted to select an address for a starting storage location and successive storage locations within said memory means for storing said units of information; and noise signal identification means connected to said transfer circuit and being adapted to establish a count in accordance with the number of said units of information transferred to said memory means, said noise identification means being connected to effect the restoration of said first means to an address representing said starting storage location upon the discontinuance of signals from said data source when said count is less than a predetermined count.

3. In a data processing apparatus for effecting the transfer to a central processor by a magnetic tape control apparatus of signals read from a magnetic tape, said processor including memory means having a plurality of addressable storage locations, first control means adapted to indicate a starting storage location and successive storage locations within an area of said memory means for reference during the transfer of said signals to said memory, and second control means connected to said first control means responsive to a transfer signal for restoring said first control means to said starting storage location, said tape control apparatus further including detection means for detecting and eliminating the effects of noise read form the inter-record gap between records on said magnetic tape as stored in said memory area wherein said detection means comprises:

storage register means adapted to receive and transfer to said central processor, signals read from said magnetic tape representative of noise and units of information for storage in successive locations of said area of memory referenced by said first control means;

means connected to be responsive to the contents of said storage register means to establish a count in accordance with a number of signals received by said register means;

control means coupled to said counting means and being adapted thereby to inhibit the termination of the record reading operation at an indicated end of record when said count is less than a predetermined count; and signal generating means connected to be responsive to said control means for generating said transfer signal for automatically restoring said first means to said starting address for referencing the same locations of said area of memory whereby subsequently transferred signals are stored in the storage locations previously storing signals identified as noise.

4. The apparatus of claim 3 wherein said detection means further includes tape mark sensing means coupled to said storage register means and to said control means, said tape mark sensing means being adapted upon the receipt of a special coded unit of information by said storage register means as a first unit of information, to generate an output control signal; and means including said control means connected to be responsive to said control signal for terminating said record reading operation at said indicated end of record when said count is less than said predetermined count.

5. Apparatus of claim 3 wherein said detection means further includes tape mark sensing means coupled to said storage register means and to said control means, said tape mark sensing means including means for receiving a read backward signal indicating that the tape is being moved in a reverse direction and being adapted by said read backward signal upon the receipt of a special coded unit of information by said storage register as a first unit of information to generate an output control signal; and means including said control means connected to be responsive to said control signal for terminating said record reading operation at said indicated end of record when said count is less than said predetermined count.

6. Apparatus of claim 3 wherein said detection means further includes tape mark sensing means coupled to said storage register means and to said control means, said tape mark sensing means including means for receiving a read forward signal indicating that the tape is being moved in a forward direction and being adapted by said read forward signal upon the receipt of a special coded unit of information by said storage register as a first unit of information to generate an output control signal; and means including said control means connected to be responsive to said control signal for terminating said record reading operation at said indicated end of record when said count is less than said predetermined count.

7. In a data processing apparatus, the combination including memory means having a plurality of addressable storage locations, address control means adapted to select an address for a starting storage location and successive sequential storage locations within an area of said memory means associated with a transfer order, means coupled to said address control means and responsive to a transfer signal for restoring said address control means to an address representing said starting storage location, and tape control means, coupled to said memory means, said tape control means comprising:

storage register means adapted to receive and transfer signals read from a magnetic tape representative of noise and units of information to said area of memory for storage in the locations referenced by said control means;

means connected to be responsive to the contents of said storage register means to establish a count in accordance with the number of signals received by said register means;

detection control means coupled to said counting means and being adapted thereby to inhibit the termination of the record reading operation at the indicated end of record when said count is less than a predetermined count; and response means coupled to said control means being adapted thereby to generate said transfer signal for restoring said address control means to select an addres for said starting storage location thereby permitting signals subsequently transferred to said area of memory to be stored in those storage locations previously storing units of noise.

8. Magnetic tape control apparatus for detecting and compensating for noise records, which are defined as one or more unwanted signals which are less than a predetermined number of signals, read from the inter-record gap between normal data records on a magnetic tape where said noise records may be transferred to an area of memory of a central processor in accordance with a transfer instruction issued by said central processor, said tape control apparatus comprising:

storage register means adapted to receive said signals representative of noise and data records read from magnetic tape for transfer to said area of memory;

counting means connected to be responsive to the contents of said register means to establish a count in accordance with the number of signals received by said register means;

detection means coupled to said counting means for generating an output noise record signal at an indicated end of record, upon said counting means having advanced to a count less than said predetermined count, for indicating the detection of a noise record; and control means coupled to said detection means and being responsove to said noise record signal for inhibiting the termination of the record reading operation.

9. Apparatus according to claim 8 wherein said magnetic tape control apparatus further includes response generating means coupled to said detection means and being adapted to generate a control signal upon the occurrence of said noise record signal and wherein said central processor further includes control means adapted to reference a starting address location and successive locations of said area of memory, said control means being adapted to be restored to said starting address location by said control signal.

10. In a data processing apparatus for effecting the transfer to a central processor by a magnetic tape control apparatus of signals read from a magnetic tape in accordance with demand response signals generated by response means associated with said tape control apparatus, said central processor including a main memory, a control memory having a starting location register and present location register associated with said transfer whereby the contents of the former identify the starting location of an area of main memory being referenced and the contents of the latter identifies the present location of said area of main memory being referenced and including means responsive to a transfer demand response signal generated by said response means to automatically effect the transfer of the contents of said starting location register to said present location register within said control memory, said tape control apparatus further including detection means for detecting and compensating for noise read from the inter-record gap between records on said magnetic tape transferred and stored as signals in said area of main memory wherein said means comprises:

storage register means adapted to receive and transfer to said central processor in successive storage locations in the main memory signals read from said magnetic tape representative of noise and units of information;

means connected to be responsive to the contents of said storage register means to establish a count in accordance with the number of signals received by said register means;

control means coupled to said counting means and being adapted thereby to inhibit the termination of the record reading operation at the indicated end of record when said count is less than a predetermined count; and means connecting said demand response means to be responsive to said control means for generating a transfer demand response signal for controlling the operation of the control memory to thereby permit signals subsequently transferred to said central processor to be stored in those locations of said memory area which are storing units of noise.

11. In a data processing apparatus for effecting the transfer of signals read from a magnetic tape between a central processor and a magnetic tape control apparatus in accordance with response signals generated by response means associated therewith, said central processor including a main memory, a control memory having a starting location register and a present location register associated with said signal transfer whereby the contents of said starting location register identifies the starting location of an area of main memory first referenced for data storage and the contents of said present location register identifies the present location within said area of main memory being referenced for subsequent data storage, and means responsive to a particular demand response signal generated by said response means to automatically effect the transfer of the contents of the said starting location register to said present location register within the control memory, the improvement comprising tape control apparatus further including detection means for detection and compensating for the presence of noise read from the inter-record gap between records on a magnetic tape and transferred to said area of memory, said detection means comprising:

storage register means adapted to receive and transfer to said central processor in successive storage locations said signals representative of noise and units of information read from said tape;

counting means connected to be responsive to the contents of said storage register means to establish a count in accordance with the number of signals received by said register means;

means connected to be responsive to said counting means for generating either first or second output control signals at an indicated end of record wherein said first signal indicates that said counting means has advanced to a predetermined count and said second signal indicates that said counting means has advanced to a count less than said predetermined count;

control means coupled to said means and being responsive to the occurrence of said first and second control signals to inhibit the termination of the record reading operation at the indicated end of record when said count is less than said predetermined count; and means connected to said response signal means to be responsive to said second output control signal for generating a transfer demand response signal for controlling the operation of the control memory whereby signals subsequently transferred to said memory area are stored in those locations previously allocated to noise.

12. Magnetic tape control apparatus for eliminating the effect of noise signals read from the inter-record gap between records on a magnetic record medium comprising:

storage register means adapted to receive signals representative of noise and units of information read from said magnetic medium;

counting means connected to be responsive to the contents of said register means to establish a count in accordance with a number of signals received by said register means;

means coupled to said counting means for generating an output control signal upon said counting means having reached a predetermined count; and control means coupled to said last named means and being responsive to said output control signal at an indicated end of record for controlling the termination of the record reading operation.

13. Magnetic tape control apparatus for eliminating the effect of noise signals read from the inter-record gap between information records on a magnetic record medium comprising:

storage register means adapted to receive signals representative of noise and units of information read from said magnetic medium for transfer to a central processor;

counting means being connected to be responsive to the contents of said storage register means to establish a count in accordance with the number of signals received by said register means and transferred to said central processor;

signal generating means coupled to said counting means for generating an output control signal at an indicated end of record when said counting means has advanced to a count less than a predetermined count;

control means coupled to said signal generating means and being connected to be responsive to said output control signal to inhibit the termination of the record reading operation; and response signal means coupled to said control means and being adapted by said output control signal to generate a response signal to said central processor indicating that the last signals transferred thereto were noise.

14. Data processing apparatus for eliminating the effect of noise signals transferred as units of information from a data source comprising:

memory means having a plurality of addressable storage locations connected to receive signals from said data source by way of a transfer circuit and being adapted to store transferred units of information in selected memory storage locations;

first means coupled to said memory means and being adapted to select an address for a starting storage location and successive storage locations within said memory means for storing said units of information;

noise signal identification means connected to said transfer circuit; and control means coupled to said first means and being connected to receive a control signal from said noise signal identification means, said control means being responsive to said control signal for restoring said first means to select the address representing said starting storage location.

15. Data processing apparatus for eliminating the effect of noise signals transferred as units of information from a data source comprising:

memory means having a plurality of addressable storage locations connected to receive signals from said data source by way of a transfer circuit and being adapted to store transferred units of information in selected memory storage locations;

first means coupled to said memory means and being adapted to select an address for a starting storage location and successive storage locations within said memory means for storing said units of information;

noise signal identification means connected to said transfer circuit, said noise signal identification means including a first control means coupled to said transfer circuit and being adapted to establish a count in accordance with the number of units of information transferred to said memory means, said first control means being adapted to generate a first signal when said count is less than a predetermined count, second control means coupled to said transfer circuit and being adapted to generate a second output signal upon the discontinuance of said noise signals for a predetermined period of time and means connected to be responsive to the joint occurrence of said first and second signals for generating a control signal; and a further control means coupled to said first means and being connected to receive said control signal from said noise signal identification means, said further control means being responsive to said control signal for restoring said first means to select the address representing said starting storage location.

16. Data processing apparatus for eliminating the effect of noise signals transferred as units of information from a data source comprising:

memory means having a plurality of addressable storage locations connected to receive signals from said data source by way of a transfer circuit and being adapted to store transferred units of information in selected memory storage locations;

first means coupled to said memory means and being adapted to select an address for a starting storage location and successive storage locations within said memory means for storing said units of information;

noise signal identification means connected to said transfer circuit; said noise signal identification means including first control means coupled to said transfer circuit and being adapted to establish a count in accordance with the number of units of information transferred to said memory means, said first control means being adapted to generate a first signal when said count is less than a predetermined count, and second control means coupled to said first control means and being connected to be responsive to said first signal to generate a control signal upon the discontinuance of said noise signals for a predetermined period of time; and further control means coupled to said first means and being connected to receive said control signal from said noise signal identification means, said further control means being responsive to said control signal for restoring said first means to select the address representing said starting storage location.

17. Data processing apparatus for eliminating the effect of noise signals transferred as units of information from a data source during a data transfer operation called for by a central processing unit comprising:

memory means having a plurality of addressable storage locations connected to receive signals from said data source by way of a transfer circuit and being adapted to store said transferred signals as units of information in selected memory storage locations;

first means coupled to said memory means and being adapted to select an address for a starting storage location and successive storage locations within said memory means for storing said units of information;

noise signal identification means connected to said transfer circuit; and control means coupled to said first means and being connected to receive a control signal from said noise signal identification means, said control means being responsive to said control signal for restoring said first means to select the address representing said starting storage location.

18. Magnetic tape control apparatus for eliminating the effect of noise read from the inter-record gap between records on a magnetic tape being moved relative to a reading means comprising:

storage register means adapted to receive and transfer to a central processor one or more signals representative of units of noise and information read from said magnetic tape as a normal data record;

counting means being adapted to be set to a predetermined minimum count at an indicated start of each record, said counting means being coupled to said storage register means and being adapted thereby to have said count decremented in accordance with the number of units received by said storage register means, said counting means including means for generating a first control signal upon said counting means having been decremented to a count of zero;

bistable means having first and second outputs, said bistable means being adapted to be initially set to a first state thereby operative to activate said first output, and means connecting said bistable means to said counting means and being adapted to be switched by said first control signal from a first state to a second state to thereby activate said second output;

end of record detection means for generating an end of record signal, said record detection means being coupled to said storage register means and being adapted to generate said end of record signal when there is an absence of said signals being received by said storage register means for a predetermined period of time; and means for generating a second control signal for effecting the normal termination of a read operation and tape motion, said means being coupled to said end of record detection means and to said second output whereby said bistable means is adapted to inhibit the generation of said second control signal upon the generation of said end of record signal when said second output has not been activated.

19. The apparatus of claim 18 wherein said apparatus further includes response signal generating means coupled to said first output of said bistable means and to said end of record detection means, said signal generating means being adapted by the activation of said first output upon the generation of said end of record signal to produce a special demand signal to said central processor indicating that the last signals transferred thereto were noise.

References Cited

UNITED STATES PATENTS

| | | | |
|---|---|---|---|
| 2,975,407 | 3/1961 | O'Brien ----------- | 340—174.1 |
| 3,054,990 | 9/1962 | Noonan ---------- | 340—174.1 |
| 3,085,230 | 4/1963 | Shoultes et al. ----- | 340—172.5 |
| 3,286,243 | 11/1966 | Floros ----------- | 340—174.1 |
| 3,397,389 | 8/1968 | Jennings et al. ----- | 340—172.5 |

OTHER REFERENCES

"Error Control for Buffer Registers"—Granito et al., IBM Tech. Disc. Bul., vol. 9, No. 7, December 1966.

BERNARD KONICK, Primary Examiner

V. P. CANNEY, Assistant Examiner

U.S. Cl. X.R.

340—172.5